Jan. 10, 1928.

H. WOLFF ET AL.

ELECTRIC INCANDESCENT LAMP

Filed Nov. 3, 1925

1,655,488

CONTAINING
HYDROCHLORIC ACID AND HYDROGEN

Inventors:
Hans Wolff,
Fritz Koref,
Franz Skaupy,
by
Their Attorney.

Patented Jan. 10, 1928.

1,655,488

UNITED STATES PATENT OFFICE.

HANS WOLFF, FRITZ KOREF, AND FRANZ SKAUPY, OF BERLIN, GERMANY, ASSIGNORS TO GENERAL ELECTRIC COMPANY, A CORPORATION OF NEW YORK.

ELECTRIC INCANDESCENT LAMP.

Application filed November 3, 1925, Serial No. 66,642, and in Germany March 18, 1925.

The present invention relates to electric lamps containing a lighting body, operated at incandescence, which consists either wholly or largely of tungsten and containing also a filling of gas which is chemically inert with respect to the incandescent filament, the pressure of the gas being so chosen that vaporization of the incandescent lighting body is retarded. As a consequence of our invention the average length of life of lamps of this type is increased by causing a larger number of lamps to attain the long life hitherto obtained only with a small proportion of a given number.

In accordance with our invention gas filled lamps are provided with a relatively small amount of volatile halogen compound preferably hydrochloric acid and a lesser proportion of hydrogen.

Figure 1:
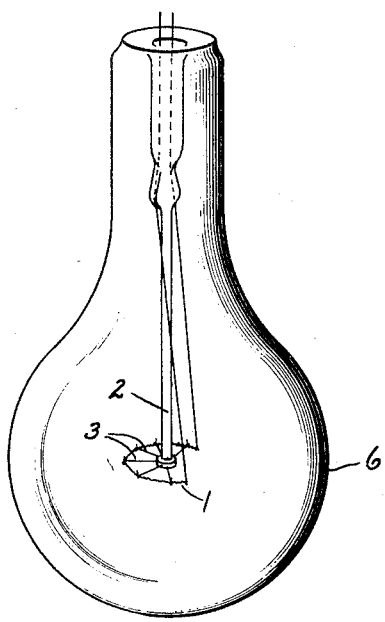
Figure 2:
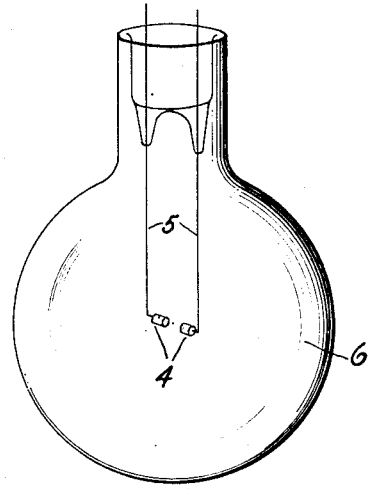

The accompanying drawing shows somewhat diagrammatically for the purpose of illustration in Fig. 1 incandescent filament lamps and in Fig. 2 an enclosed arc lamp, both being provided with a halogenated gaseous filling.

The lamp shown in Fig. 1 is provided with a filament 1 consisting of closely coiled wire, the filament being supported on the standard 2 by hooks 3 as usual. The lamp shown in Fig. 2 is provided with arc supporting electrodes 4 carried by the conductors 5.

In carrying out our invention the bulb 6 of the lamp of either type is exhausted, and provided in the usual well understood manner with a filling of suitable gas, such as argon or nitrogen, or a mixture of suitable gases. In addition to a filling of these gases, a relatively small amount of hydrochloric acid, or other suitable gaseous halogen compound, is introduced together with a small proportion of hydrogen, which in the case of hydrochloric acid gas advantageously may be less than 15% by volume of the quantity of hydrochloric acid. For example, in the case of a 60 watt, 110 volt tungsten incandescent lamp the gaseous filling may consist of argon at a pressure of about 400 mm. of mercury hydrochloric acid gas, about 20 mm. of mercury and hydrogen at a pressure of about 2 to 3 mm. of mercury. In some cases, as for example in the case of incandescent lamps provided with filaments of finer diameter the proportion of hydrochloric acid and hydrogen may be less. For example, a 40 to 60 watt, 220 volt incandescent lamp may be provided with gaseous filling consisting of argon at 400 mm., hydrochloric acid gas at 2 to 5 mm., and of hydrogen at 0.2 to 0.7 mm. mercury pressure.

In addition to reducing the hitherto unavoidable inequalities in the length of life of incandescent lamps by increasing the length of life of the lamps which formerly burned out after relatively short period of operation, the introduction of a halogen compound and hydrogen reduces the opacity of the metal deposited on the inner surface of the bulb during the operation of the lamp, apparently by the formation of more or less transparent hydrogen compounds of tungsten. The presence of the halogen compound also reduces the danger of undesired electric discharges through the gas between different parts of the filaments or the leading-in wires during the operation of the lamp.

Instead of introducing the hydrochloric gas with the other gas fillings in the manufacture of lamps, the advantages of our invention may be obtained by introducing into the lamp a small quantity of a halogen compound of tungsten together with the desired quantity of hydrogen admixed with the argon or nitrogen, or other filling of inert gas. During the operation of the lamp a part of the vapor of tungsten chloride or other halogen compound will decompose by contact with the incandescent body thereby setting free chlorine which combines with a part of the hydrogen present in the bulb to produce hydrochloric acid. The tungsten set free from the compound will deposit on the hot spots of the light body thereby equalizing and strengthening the same. The reaction will continue until an equilibrium condition is reached. It is also possible to carry out our invention by introducing only hydrochloric acid gas, without hydrogen, into the lamp together with the inert gas. When the lighting body is operated at incandescence a part of the hydrochloric acid gas is decomposed thus forming hydrogen. This process also continues until a state of equilibrium is reached.

While the benefits of our invention may be obtained without the knowledge of the processes or chemical reactions which occur within a lamp, we believe the following to be an explanation of the conditions occurring during operation. The correctness of the explanation hereby given of course does not affect the nature of the invention or the benefits to be obtained therefrom.

During the operation of the lamp made in accordance with our invention some of the metal is volatilized although at a very slow rate and as the volatilized metal leaves the lighting body it is converted by the hydrochloric acid into tungsten halogen compounds volatilizable at ordinary temperature. These compounds are brought continuously into contact with the incandescent lighting body so that there is maintained continuously in the lamp a counter pressure of volatile tungsten compound which retards the tendency of the incandescent body to volatilize itself.

It is also known that the action of water vapor in an incandescent lamp is particularly harmful as the water vapor attacks the hottest spots of the lighting body thereby forming an oxide of tungsten and hydrogen and thereby causing these spots to continuously become more reduced in section and therefore to become hotter so that the harmful action increases continuously until the filament is destroyed. The tungsten oxides thus formed are deposited on the bulb. The hydrogen which is released by decomposition of water vapor reduces these oxides, the water vapor again being formed, thus making the process cyclic. The reduction of the filament section continues until the filament is destroyed. This extremely harmful cyclic process due to water vapor is retarded in lamps provided with hydrochloric acid in accordance with our invention by a counter pressure of a volatile tungsten halogen compound.

We have found that the equilibrium point for the reaction between tungsten and hydrochloric acid is displaced only slightly with an increasing temperature. The equilibrium point of reaction between tungsten and water vapor is greatly displaced with the rise in temperature. This fact apparently explains the difference in behavior of hydrochloric acid gas with respect to the hot spots on the filament as compared with water vapor.

What we claim as new and desire to secure by Letters Patent of the United States, is,—

1. An electric lamp containing a lighting body operable at incandescence and containing a gaseous filling at a sufficiently high pressure to materially reduce evaporation of said body, said filling including a substantial amount of halogen acid gas.

2. An incandescent electric lamp comprising a bulb containing a lighting body consisting essentially of tungsten and provided with a gaseous filling at sufficiently high pressure to materially reduce evaporation of said tungsten body, and consisting largely of a gas inert with respect to tungsten and in lesser proportions of halogen acid and hydrogen.

3. An electric lamp containing a lighting body of tungsten, and being provided with a gas filling at relatively considerable pressure including hydrochloric acid gas at a pressure of several millimeters of mercury and hydrogen at a pressure of a few tenths of a millimeter of mercury.

4. An electric incandescent lamp comprising a bulb, a tungsten filament mounted therein, a charge of gas therein comprising argon at a pressure of about 400 m. m., hydrochloric acid gas at about 2 to 5 m. m. and hydrogen at about 0.2 to 0.7 m. m. of mercury respectively.

In witness whereof, we have hereunto set our hands this 16th day of October, 1925.
HANS WOLFF.
FRITZ KOREF.
FRANZ SKAUPY.